(12) United States Patent
Tanahashi et al.

(10) Patent No.: US 10,260,565 B2
(45) Date of Patent: Apr. 16, 2019

(54) WHEEL SUPPORT DEVICE FOR VEHICLE

(71) Applicant: TOYOTA JIDOSHA KABUSHIKI KAISHA, Toyota-shi, Aichi-ken (JP)

(72) Inventors: Toshio Tanahashi, Susono (JP); Yoji Kanehara, Nagoya (JP); Koshi Yamada, Odawara (JP)

(73) Assignee: TOYOTA JIDOSHA KABUSHIKI KAISHA, Toyata-shi, Aichi-ken (JP)

( * ) Notice: Subject to any disclaimer, the term of this patent is extended or adjusted under 35 U.S.C. 154(b) by 526 days.

(21) Appl. No.: 15/009,064

(22) Filed: Jan. 28, 2016

(65) Prior Publication Data

US 2016/0223024 A1   Aug. 4, 2016

(30) Foreign Application Priority Data

Jan. 29, 2015   (JP) ................................. 2015-015928

(51) Int. Cl.
*F16C 41/00*   (2006.01)
*B60B 27/00*   (2006.01)
(Continued)

(52) U.S. Cl.
CPC ............ *F16C 41/002* (2013.01); *B60B 27/00* (2013.01); *B60B 27/0047* (2013.01); *F16C 19/18* (2013.01); *F16C 33/76* (2013.01); *F16D 3/24* (2013.01); *B60B 27/001* (2013.01); *B60B 27/0005* (2013.01); *B60B 2380/00* (2013.01); *B60B 2900/1212* (2013.01); *B60B 2900/561* (2013.01); *Y02T 10/86* (2013.01)

(58) Field of Classification Search
CPC .................................................... F16C 41/002
See application file for complete search history.

(56) References Cited

U.S. PATENT DOCUMENTS 3,597,668 A   8/1971   Yoshimine
3,922,214 A   11/1975   Van Cakenberghe
(Continued)

FOREIGN PATENT DOCUMENTS

JP   5026778 A   3/1975
JP   61194999 A   8/1986
(Continued)

OTHER PUBLICATIONS

An Office Action dated Dec. 14, 2016, which issued during the prosecution of U.S. Appl. No. 15/018,085.
(Continued)

*Primary Examiner* — Ronald W Leja
*Assistant Examiner* — Christopher J Clark
(74) *Attorney, Agent, or Firm* — Sughrue Mion, PLLC

(57) ABSTRACT

A wheel support device for a vehicle includes a bearing that rotatably supports a wheel, and is lubricated by a lubricant, a bearing support member, and a self-discharge type charge eliminator provided on a surface of a particular member. The self-discharge type charge eliminator is configured to change air around the self-discharge type charge eliminator into negative air ions, and eliminate charge by causing the air ions to attract positive charges of the particular member for neutralization, so as to reduce the quantity of charge of the particular member, and thereby reduce the quantity of charge of the lubricant.

6 Claims, 8 Drawing Sheets

(51) Int. Cl.
   *F16C 19/18* (2006.01)
   *F16C 33/76* (2006.01)
   *F16D 3/24* (2006.01)

(56) References Cited

U.S. PATENT DOCUMENTS

| | | | |
|---|---|---|---|
| 4,795,935 A | 1/1989 | Fujii et al. | |
| 5,021,918 A * | 6/1991 | Maki | B60B 7/002 |
| | | | 152/152.1 |
| 5,095,400 A | 3/1992 | Saito | |
| 5,382,359 A | 1/1995 | Brandt | |
| 5,501,899 A * | 3/1996 | Larkin | D04C 1/12 |
| | | | 361/212 |
| 6,109,794 A * | 8/2000 | Bertetti | F16C 33/7879 |
| | | | 277/565 |
| 6,235,385 B1 | 5/2001 | Lee | |
| 7,248,454 B2 | 7/2007 | Takayanagi | |
| 7,670,057 B2 * | 3/2010 | Kawamura | B60B 27/0005 |
| | | | 384/544 |
| 7,684,169 B1 * | 3/2010 | Larkin | H05F 3/02 |
| | | | 361/231 |
| 7,832,528 B1 | 11/2010 | Liang | |
| 7,971,689 B2 | 7/2011 | Moore | |
| 8,503,154 B2 | 8/2013 | Nakai | |
| 9,044,916 B2 | 6/2015 | Koike et al. | |
| 9,995,344 B2 * | 6/2018 | Dittes | G01N 27/226 |
| 2002/0179311 A1 * | 12/2002 | Alper | B60R 16/06 |
| | | | 174/5 SG |
| 2003/0183465 A1 | 10/2003 | Ikeda | |
| 2005/0018375 A1 | 1/2005 | Takayanagi | |
| 2008/0036241 A1 | 2/2008 | Aisenbrey | |
| 2009/0242334 A1 | 10/2009 | Moore | |
| 2012/0039012 A1 | 2/2012 | Nakai | |
| 2016/0059838 A1 | 3/2016 | Yamada et al. | |
| 2016/0108868 A1 | 4/2016 | Tanahashi et al. | |
| 2016/0177811 A1 | 6/2016 | Tanahashi et al. | |
| 2016/0186639 A1 * | 6/2016 | Tanahashi | F01N 13/16 |
| | | | 361/217 |
| 2016/0186703 A1 | 6/2016 | Tanahashi et al. | |
| 2016/0200270 A1 | 7/2016 | Tanahashi et al. | |
| 2016/0208748 A1 | 7/2016 | Tanahashi et al. | |
| 2016/0214453 A1 | 7/2016 | Tanahashi et al. | |
| 2016/0230824 A1 | 8/2016 | Tanahashi et al. | |
| 2016/0280162 A1 * | 9/2016 | Yamada | B62D 35/00 |
| 2018/0086164 A1 * | 3/2018 | Tanahashi | B60G 7/00 |

FOREIGN PATENT DOCUMENTS

| | | | | |
|---|---|---|---|---|
| JP | 05-238438 A | 9/1993 | | |
| JP | 1055895 A | 2/1998 | | |
| JP | 2001-234469 A | 8/2001 | | |
| JP | 2001355524 A | 12/2001 | | |
| JP | 2002-104106 A | 4/2002 | | |
| JP | 2006-234093 A | 9/2006 | | |
| JP | 2007302202 A | 11/2007 | | |
| JP | 2008-181694 A | 8/2008 | | |
| JP | 2010-192177 A | 9/2010 | | |
| JP | 3191490 U | 6/2014 | | |
| JP | WO 2015064195 A1 * | 5/2015 | | B62D 35/00 |
| KR | 1998-0015718 U | 6/1998 | | |
| WO | 2015/064195 A1 | 5/2015 | | |

OTHER PUBLICATIONS

Communication dated Oct. 20, 2017, from the United States Patent and Trademark Office in U.S. Appl. No. 15/018,085.

An Office Action dated Jun. 7, 2017, which issued during the prosecution of U.S. Appl. No. 15/018,085.

Partial Translation of Notification of Submission of Opinion dated Jul. 19, 2017, issued by the Korean Intellectual Property Office in counterpart application No. 10-2016-0010987.

* cited by examiner

WHEEL SUPPORT DEVICE FOR VEHICLE

CROSS-REFERENCE TO RELATED APPLICATIONS

This application claims priority from Japanese Patent Application No. 2015-015928 filed on Jan. 29, 2015, the disclosure of which including the specification, drawings and abstract is incorporated herein by reference in its entirety.

BACKGROUND

1. Field

Exemplary embodiments relate to a wheel support device for a vehicle, and in particular to a wheel support device including a bearing that rotatably supports a wheel.

2. Description of Related Art

When a vehicle, such as an automobile, runs, static electricity is generated in the vehicle since the air flows while being in friction contact with the vehicle. Also, static electricity is generated, due to repeated contact and separation of each portion of tires with and from a road surface as wheels of the vehicle rotate, and also due to relative movements of constituent components of an engine and a brake system, for example.

The vehicle is substantially electrically insulated from the ground due to the presence of the tires having low electric conductivity. Therefore, if static electricity is generated in the vehicle, the vehicle body, etc. are electrostatically charged (generally with positive charges). Since radio noise is likely to be generated if the vehicle body, etc. are charged, structures for reducing electric charges carried by the vehicle have been studied, and various structures have been proposed.

For example, a bearing device having an inner race member, an outer race member, and a plurality of rolling elements interposed between the race members is described in Japanese Patent Application Publication No. 2006-234093 (JP 2006-234093 A). The bearing device has seal devices each including an elastic member that contacts one of the race members, and the interior of the bearing device is filled with conductive grease.

In the bearing device as described in JP 2006-234093 A, electric charges can be moved from the grease to the race members since the grease has electric conductivity. However, in a situation where the vehicle body, etc. are electrically charged, members surrounding the bearing device are also electrically charged, and therefore, charges cannot be moved from the race members to the surrounding members. Therefore, the grease cannot be effectively prevented from being electrically charged. In order to transfer charges from the race members to the surrounding members, it is necessary to remove or eliminate charges carried by the surrounding members of the bearing device by earthing, by means of a special device, such as an electrostatic eliminator, as described in Japanese Patent Application Publication No. 2008-181694 (JP 2008-181694 A), for example.

SUMMARY

Through experimental research conducted by the inventor, it was found that charges can be eliminated by releasing charges into the air by means of an air-ion-exchange type self-discharge charge eliminator, rather than transferring charges from the race members to the members surrounding the bearing device by means of the special device, such as the electrostatic eliminator.

Therefore, a wheel support device for a vehicle is provided in which charges carried by grease in a bearing of the wheel support device are eliminated without requiring a special device, such as an electrostatic eliminator, so that the viscosity of the grease is prevented from being increased due to charging, and the viscosity resistance in the bearing is prevented from being increased.

According to one aspect of an exemplary embodiment, a wheel support device for a vehicle includes a bearing, a bearing support member, and a self-discharge type charge eliminator. The vehicle has a road surface and a body held electrically by an insulation state. The bearing rotatably supports a wheel, and is lubricated by a lubricant. The bearing support member supports the bearing. The self-discharge type charge eliminator is provided on a surface of a particular member. The particular member is at least one of the bearing, the bearing support member, and an accessory member. The accessory member is connected to the bearing support member while being in contact with the bearing support member. The self-discharge type charge eliminator is an air-ion-exchange type self-discharge charge eliminator. The air-ion-exchange type self-discharge charge eliminator is configured to change air around the self-discharge type charge eliminator into negative air ions, according to the quantity of positive charges carried by the particular member, and eliminate charge by causing the air ions to attract the positive charges of the particular member for neutralization, so as to reduce the quantity of charge of the particular member, and thereby reduce the quantity of charge of the lubricant.

The reason why a lubricant, such as grease, in the bearing is electrically charged when the vehicle body, etc. are electrically charged, and the reason why the viscosity of the lubricant is increased when the oil is electrically charged may be as follows. The bearing has a rotary race member that rotates with a wheel, a stationary race member, and a plurality of rolling elements interposed between the rotary race member and the stationary race member, and the stationary race member and the rotary race member are supported by a non-rotating support member and a rotating support member, respectively. The non-rotating support member is connected to the vehicle body via a suspension member, or the like, and the rotating support member is connected to the wheel.

Accordingly, if the vehicle body, etc. are electrically charged, electric charges move to the stationary race member and the rotary race member via the non-rotating support member and the rotating support member, respectively. If the quantity of charges carried by the stationary race member and the rotary race member is increased, a portion of the charges move to the lubricant in the bearing, whereby the lubricant is electrically charged. If the lubricant is electrically charged, the freedom of molecules of the lubricant is reduced, presumably resulting in an increase of the viscosity of the lubricant.

According to the above aspect of an exemplary embodiment, the self-discharge type charge eliminator is provided on the surface of the particular member as at least one of the bearing, bearing support member, and the accessory member connected to the bearing support member while being in contact with the bearing support member. The charge eliminator changes the ambient air into negative air ions, and eliminates charge by causing the air ions to attract positive charges of the particular member for neutralization, so as to reduce the quantity of charge of the particular member. As a result, charges carried by the lubricant in the bearing move to the particular member, so that the quantity of charge of the lubricant is reduced; therefore, the viscosity of the lubricant can be prevented from being increased due to excessive charging, and the viscosity resistance in the bearing can be prevented from being increased.

According to an aspect of an exemplary embodiment, an electrostatic eliminator having a complicated structure is not needed, and it is not necessary to connect an electrostatic eliminator to a negative terminal of a battery and the vehicle body via conducting wires. Also, the self-discharge type charge eliminator may be a thin conductor, for example, which can perform so-called self-discharge by using charges carried by the particular member; therefore, a large space is not needed as in the case where the electrostatic eliminator is installed. It is, however, to be noted that an electrostatic eliminator may be installed on a vehicle in which a wheel support device according to the exemplary embodiments is incorporated.

In the wheel support device according to the above aspect of an exemplary embodiment, the bearing may include a rotary race member that rotates with the wheel, a stationary race member, and a plurality of rolling elements. The rolling elements are interposed between the rotary race member and the stationary race member. The particular member may be the bearing support member. The bearing support member may include a rotating support member. The rotating support member supports the rotary race member. The self-discharge type charge eliminator may be provided on the rotating support member, and charges can move between the rotary race member and the rotating support member.

According to the above arrangement, the particular member is the bearing support member, and the self-discharge type charge eliminator is provided on the rotating support member of the bearing support member, while electric charges can move between the rotary race member and the rotating support member. It is thus possible to reduce the quantity of charge of the rotating support member through neutralization by the self-discharge type charge eliminator, so that electric charges carried by the lubricant in the bearing are transferred to the rotating support member via the rotary race member, resulting in a reduction of the quantity of charge of the lubricant.

In the wheel support device according to the above aspect of an exemplary embodiment, the bearing may include a rotary race member that rotates with a rotary shaft, a stationary race member, and a plurality of rolling elements. The rolling elements are interposed between the rotary race member and the stationary race member. The particular member may be the bearing support member. The bearing support member may include a non-rotating support member, and the non-rotating support member may support the stationary race member. The self-discharge type charge eliminator may be provided on the non-rotating support member, and charges can move between the stationary race member and the non-rotating support member.

According to the arrangement as described above, the particular member is the bearing support member, and the self-discharge type charge eliminator is provided on the non-rotating support member of the bearing support member, while electric charges can move between the stationary race member and the non-rotating support member. It is thus possible to reduce the quantity of charge of the non-rotating support member through neutralization by the self-discharge type charge eliminator, so that electric charges carried by the lubricant in the bearing are transferred to the non-rotating support member via the stationary race member, resulting in a reduction of the quantity of charge of the lubricant.

In the wheel support device according to the above aspect of an exemplary embodiment, the bearing may include a rotary race member that rotates with a rotary shaft, a stationary race member, a plurality of rolling elements, and a seal member. The rolling elements may be interposed between the rotary race member and the stationary race member. The seal member may be made of a resin and may provide a seal between the rotary race member and the stationary race member in an end portion of the bearing. The particular member may be the bearing. The self-discharge type charge eliminator may be provided on the seal member, and charges can move between at least one of the rotary race member and the stationary race member, and the seal member.

According to the arrangement as described above, the particular member is the bearing, and the self-discharge type charge eliminator is provided on the seal member, while electric charges can move between at least one of the rotary race member and the stationary race member, and the seal member. It is thus possible to reduce the quantity of charge of the seal member through neutralization by the self-discharge type charge eliminator, so that electric charges carried by the lubricant in the bearing are transferred to the seal member, and the quantity of charge of the lubricant present in the vicinity of the seal member can be reduced. Also, since electric charges carried by the lubricant in the bearing move to the seal member via at least one of the rotary race member and the stationary race member, the quantity of charge of the lubricant present in a region remote from the seal member can be reduced. Further, since the seal member is made of resin, the quantity of charge carried by the seal member is increased, as compared with the case where the seal member is formed of a material, such as rubber, other than resin; therefore, the neutralizing action performed by the self-discharge type charge eliminator can be enhanced, and the quantity of charge of the lubricant can be efficiently reduced.

In the wheel support device according to the above aspect of an exemplary embodiment, the bearing may include a rotary race member that rotates with a rotary shaft, a stationary race member, and a plurality of rolling elements. The rolling elements may be interposed between the rotary race member and the stationary race member. The particular member may be the accessory member, and the accessory member may include a brake back plate. The self-discharge type charge eliminator may be provided on the brake back plate, and charges can move between the stationary race member and the brake back plate.

According to the arrangement as described above, the particular member is the accessory member, and the self-discharge type charge eliminator is provided on the brake back plate as one of the accessory members, while electric charges can move between the stationary race member and the brake back plate. Accordingly, the quantity of charge of the brake back plate is reduced through neutralization by the self-discharge type charge eliminator, so that electric charges carried by the bearing support member move to the brake pack plate. As a result, electric charges carried by the lubricant in the bearing move to the bearing support member via the race members, so that the quantity of charge of the lubricant can be reduced.

In the wheel support device according to the above aspect of an exemplary embodiment, the wheel may be a drive wheel, and the bearing may rotatably support a rotary shaft that rotates with the drive wheel. Further, driving force from a drive shaft for a wheel may be transmitted to the rotary shaft via a universal joint.

According to the arrangement as described above, the charge quantity of the bearing is reduced through neutralization by the self-discharge type charge eliminator, so that electric charges carried by the rotary shaft move to the bearing; therefore, the quantity of charge carried by the universal joint can also be reduced. Accordingly, it is possible to reduce the quantity of charge carried by the lubricant in the universal joint, without providing a self-discharge type charge eliminator on the universal joint, for example, and thus prevent the viscosity of the lubricant in the universal joint from being excessively increased due to charging.

In the wheel support device according to the above aspect of an exemplary embodiment, the self-discharge type charge eliminator may include an electrically conductive metal foil having a multiplicity of minute protrusions and recesses at a side surface of an outer periphery, and a layer of an adhesive applied to one surface of the metal foil. The self-discharge type charge eliminator may be fixed to the particular member by bonding using the layer of the adhesive.

According to the arrangement as described above, the metal foil that eliminates charge can be easily fixed by bonding to the surface of the particular member. Further, the metal foil adheres to the particular member via the layer of the adhesive that covers the entire area of the metal foil. Therefore, transfer of electric charges from the particular member to the metal foil can be efficiently performed, and the effect of neutralization can be enhanced.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIGS. 7A and 7B are a schematic explanatory views showing a mechanism of neutralization by the self-discharge type charge eliminator, wherein FIG. 7A is a cross-sectional view, and FIG. 7B is a plan view;

DETAILED DESCRIPTION OF EMBODIMENTS

Referring to the accompanying drawings, preferred embodiments of the invention will be described in detail.

First Exemplary Embodiment

Figure 1:
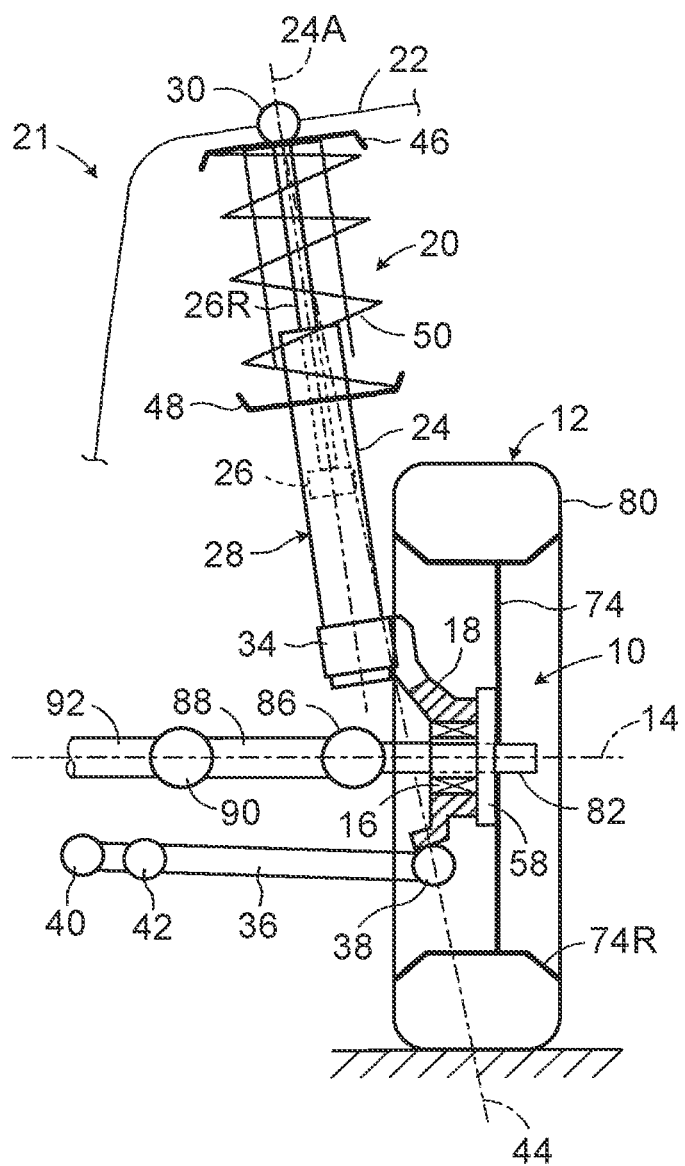
FIG. 1 is a schematic view showing a wheel support device according to a first exemplary embodiment, which is used for a McPherson strut type front suspension, as viewed from the rear of a vehicle.

FIG. 1 is a schematic view showing a wheel support device 10 according to a first exemplary embodiment of the invention, as viewed from the rear of a vehicle.

Figure 2:
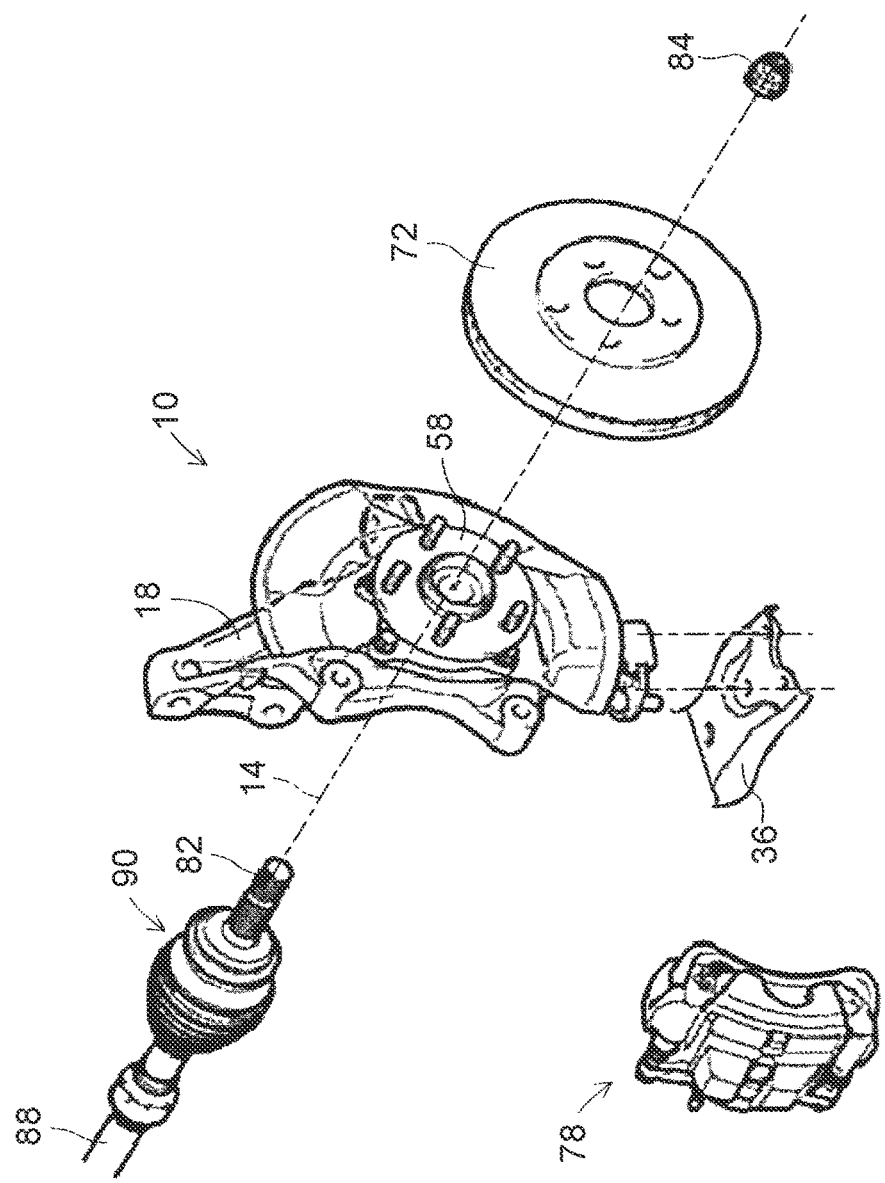
FIG. 2 is an exploded, perspective view showing a part of the wheel support device shown in FIG. 1.

The wheel support device 10 is used for a McPherson strut type front suspension. FIG. 2 is an exploded, perspective view showing a part of the wheel support device 10 shown in FIG. 1.

In these figures, the wheel support device 10 has a bearing 16 that supports a wheel 12 such that the wheel 12 can rotate about its rotational axis 14, and a knuckle 18 as a non-rotating support member that supports the bearing 16. The knuckle 18 is connected to a vehicle body 22 of a vehicle 21 via a McPherson strut 20 as a suspension member. The McPherson strut 20 has a shock absorber 28 including a cylinder 24 and a piston 26. The piston 26 is fitted in the cylinder 24 such that the piston 26 can reciprocate relative to the cylinder 24 along its axis 24A. A rod portion 26R of the piston 26 passes through the upper end of the cylinder 24 and extends upward.

In the meantime, members explained in this specification, except for those of which constituent materials are particularly mentioned, are formed of metal, such as steel, having electric conductivity. Further, portions of the metal members which are exposed to the atmosphere are painted, and their surfaces are covered with non-conductive coating films, for improvement of the durability.

The shock absorber 28 is connected at an upper end portion of the rod portion 26R to the vehicle body 22, via an upper support 30, and is connected to an upper end portion of the knuckle 18, via a bracket 34 fixed to a lower end portion of the cylinder 24. In the case where the suspension is of a type other than the McPherson strut type, a lower end portion of the shock absorber 28 may be connected to the knuckle 18 or another suspension member, such as a suspension arm, via a rubber bushing (not shown).

An outer end of a control arm (lower arm) 36 as a suspension arm is pivotally connected to a lower end portion of the knuckle 18, via a ball joint 38. In the illustrated embodiment, the control arm 36 is an L-shaped arm having an inner end and a rear end, in addition to the outer end, and the inner end and the rear end are swingably supported by a bracket (not shown) of the vehicle body via rubber bushings 40, 42, respectively. The center of a ball portion of the ball joint 38 provided at the outer end of the control arm 36 and the center of the upper support 30 cooperate with each other to define a kingpin axis 44. Accordingly, the wheel 12 is driven about the kingpin axis 44 via a tie rod by a power steering system (not shown), for steering of the vehicle.

The upper end portion of the rod portion 26R of the piston 26 passes through an upper spring seat 46 to extend therefrom, and the upper spring seat 46 is fixed to the rod portion 26R. A compression coil spring 50 as a suspension spring is elastically mounted between the upper spring seat 46 and a lower spring seat 48 fixed to the cylinder 24.

Figure 3:
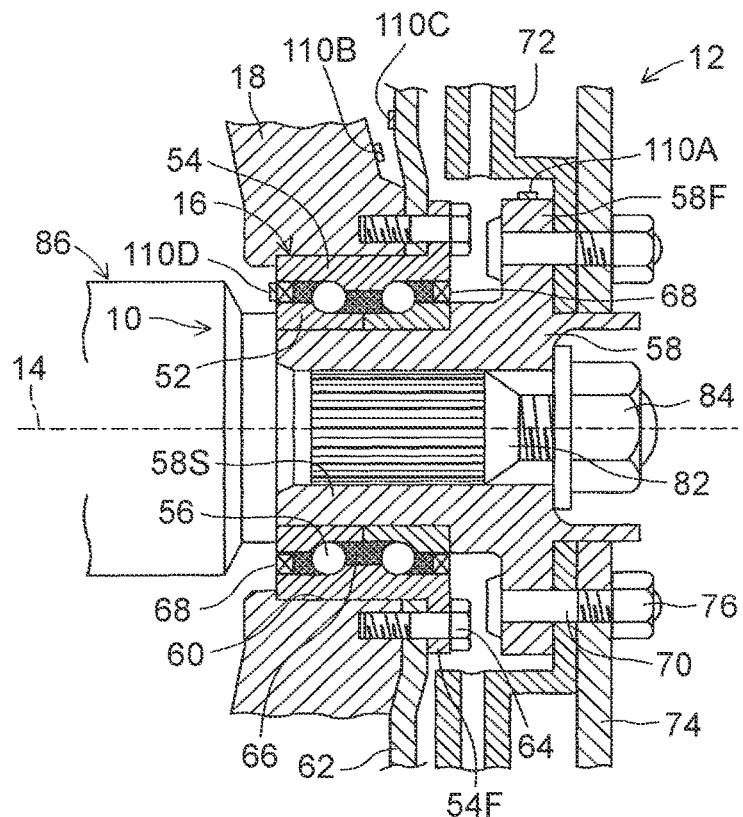
FIG. 3 is an enlarged partial cross-sectional view schematically showing a principal part of the wheel support device shown in FIG. 1.

As shown in FIG. 3, the bearing 16 has an inner race 52 as a rotary race member, an outer race 54 as a stationary race member, and balls 56 as a plurality of rolling elements interposed between the inner race 52 and the outer race 54. The inner race 52 is disposed around a sleeve portion 58S of an axle hub 58 which extends along the rotational axis 14, and is fixed by press fitting, for example, to the sleeve portion 58S. A part of the inner race 52 may be formed by the sleeve portion 58S. The axle hub 58 constitutes a rotating support member that cooperates with the knuckle 18 to support the bearing 16.

A flange portion 54F is provided at one end of the outer race 54, and a portion of the outer race 54 other than the flange portion 54F is tightly inserted in a bearing support hole 60 provided in the knuckle 18. A radially inner portion of a brake back plate 62 is interposed between the flange portion 54F and the knuckle 18. The flange portion 54F and the brake back plate 62 are attached to the knuckle 18 with a bolt 64 inserted therethrough. Thus, the brake back plate 62 is one of accessory members connected to the knuckle 18 as a non-rotating support member.

The inner space of the bearing 16 is filled with grease 66 as a lubricant, and friction between the balls 56 and the inner race 52 and outer race 54 is reduced by the grease 66. Seal members 68 made of resin are disposed at the opposite ends of the bearing 16, and are fixed by press fitting, for example, to the outer race 54. With this arrangement, electric charges can move between the outer race 54 and the seal members 68.

The seal members 68 may be in sliding contact with the inner race 52, so that electric charges can move between the inner race 52 and the seal members 68. The seal members 68 prevent the grease 66 from flowing out of the bearing 16, and also prevent powder dust and mud water from entering the bearing 16. While the grease 66 preferably has electric conductivity so as to facilitate charge movement, it is possible to eliminate electric charges carried by the grease, even if the grease 66 does not have conductivity.

The axle hub 58 has a flange portion 58F, and five hub bolts 70 are fixed by press fitting, for example, to the flange portion 58F. Each of the hub bolts 70 protrudes from the flange portion 58F in a direction away from the knuckle 18, and is inserted through a corresponding one of bolt holes provided in a radially inner portion of a brake disc 72, and a corresponding one of bolt holes provided in a radially inner portion of a wheel member 74 of the wheel 12. A nut 76 is screwed on a distal end of each hub bolt 70, so that the brake disc 72 and the wheel member 74 are coupled integrally with the axle hub 58. As shown in FIG. 2, a brake caliper assembly 78 is mounted to the knuckle 18, and the brake disc 72 is pressed against a brake pad (not shown) provided in the brake caliper assembly 78 so that braking force is generated.

Referring again to FIG. 1, a tire 80 formed of rubber, or the like, is mounted on a rim portion 74R at the outer periphery of the wheel member 74, and the wheel member 74 and the tire 80 constitute the wheel 12. As shown in FIG. 1 and FIG. 2, the wheel 12 is a steerable wheel, and also a drive wheel, and an axle 82 that rotates about the rotational axis 14 is inserted through the inner race 52 of the bearing 16. The axle 82 and the inner race 52 are splined to each other so as not to rotate relative to each other, and the axle 82 is coupled integrally with the axle hub 58 by means of a hub nut 84 screwed on a distal end of the axle 82. As shown in FIG. 1, an inner end of the axle 82 is coupled to an outer end of an intermediate shaft 88 by means of a universal joint 86, and an inner end of the intermediate shaft 88 is coupled to an outer end of a front-wheel drive shaft 92 by means of a universal joint 90. Although not shown in the drawings, driving force is supplied from a driving source of the vehicle to the drive shaft 92 via a driving force transmission system during running of the vehicle.

Figure 4:
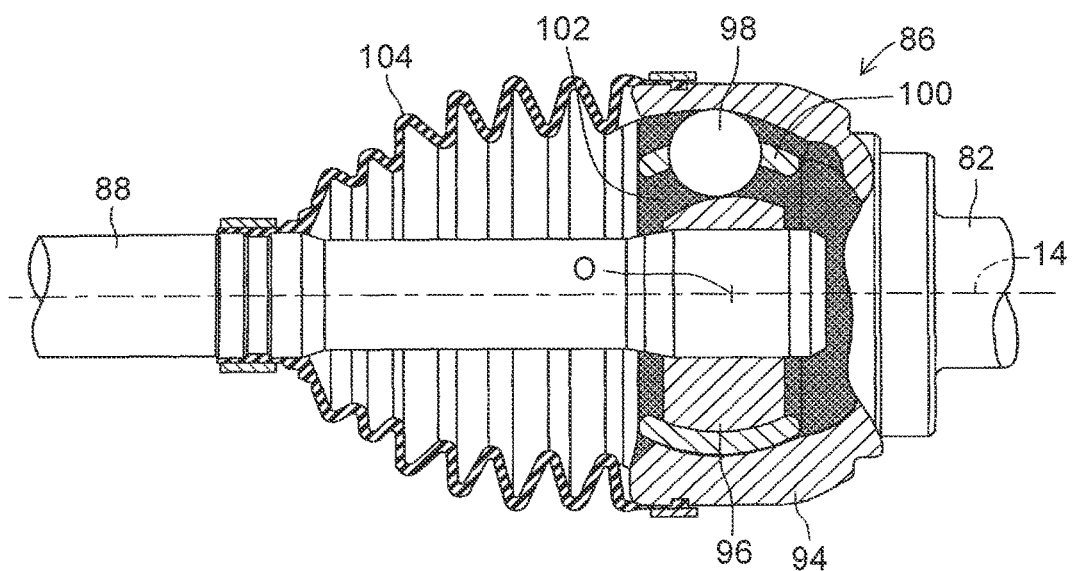
FIG. 4 is an enlarged cross-sectional view showing a wheel-side universal joint shown in FIG. 1.

The universal joints 86 and 90 have substantially the same configuration. Accordingly, only the universal joint 86 will be described. As shown in FIG. 4, the universal joint 86 includes a socket-like outer ring 94, a spherical inner ring 96, and a plurality of balls 98 disposed between the outer ring 94 and the inner ring 96. The outer ring 94 is formed integrally with the inner end of the axle 82, and the inner ring 96 is fixed by press fitting, for example, to an outer end portion of the intermediate shaft 88. Each of the balls 98 is held by a cage 100 such that it is partially received in an outer-ring ball groove and an inner-ring ball groove provided in the outer ring 94 and the inner ring 96, respectively.

The driving force of the intermediate shaft 88 is transmitted to the axle 82 via the plurality of balls 98 and the outer ring 94. The axle 82 and the intermediate shaft 88 can pivot relative to each other about the center O of the universal joint 86. The inner space of the universal joint 86 is filled with grease 102 as a lubricant, and friction between the balls 98 and the outer ring 94 and inner ring 96 is reduced by the grease 102. A dust boot 104 is attached at one end to the outer ring 94, and is attached at the other end to the intermediate shaft 88. The dust boot 104 prevents powder dust and mud water from entering the universal joint 86.

As is understood from the above description, the bearing 16, knuckle 18, axle hub 58, etc. function as a wheel carrier that supports the wheel 12 such that the wheel 12 is rotatable about the rotational axis 14. While the vehicle is running, the wheel 12 may make an up-and-down motion relative to the vehicle body 22, and may also make a turning motion about the kingpin axis 44. The universal joints 86 and 90 cooperate with each other to function as a constant-velocity joint, and permit the up-and-down motion and turning motion of the wheel 12 while assuring conditions under which driving force is supplied to the wheel 12.

As shown in FIG. 3, self-discharge type charge eliminator 110A in the form of a strip or a reed is fixed by bonding to a cylindrical surface of the flange portion 58F of the axle hub 58 so as to extend in the circumferential direction. Self-discharge type charge eliminators 110B and 110C in the form of strips are fixed by bonding to an outer surface of the knuckle 18 as viewed in the vehicle lateral direction, and an inner surface of the brake back plate 62 as viewed in the vehicle lateral direction, so as to extend vertically in radial directions. Further, a self-discharge type charge eliminator 110D in the form of a strip is fixed by bonding to an outer surface of the seal member 68 on the inner side as viewed in the vehicle lateral direction, so as to extend in the circumferential direction.

Figure 5:
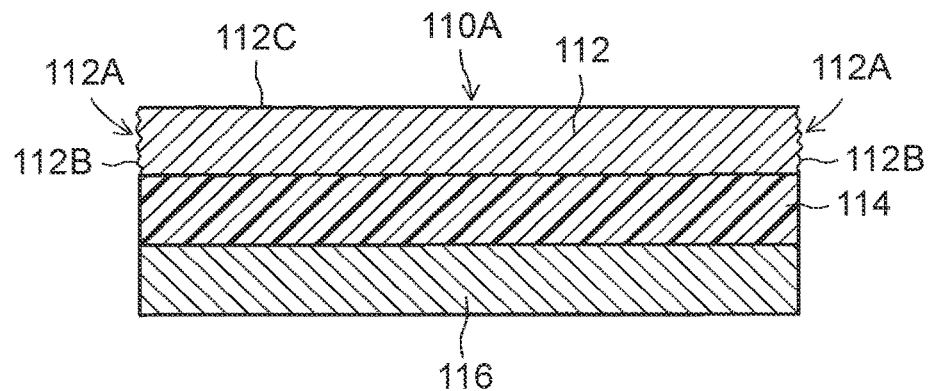
FIG. 5 is an enlarged cross-sectional view showing a self-discharge type charge eliminator before it is bonded.

The self-discharge type charge eliminators 110A-110D have the same structure. Accordingly, only the charge eliminator 110A will be described with reference to FIG. 5 showing a cross-section of the charge eliminator 110A before it is bonded to the flange portion 58F. The charge eliminator 110A is formed by shearing or cutting a composite sheet formed by applying a conductive adhesive 114 to a conductive metal foil 112, and attaching a release paper 116 that covers the adhesive 114 to the adhesive 114, into suitable size and shape. To fix the charge eliminator 110A to a member to be neutralized, the release paper 116 is peeled off, and the metal foil 112 is bonded to the member with the adhesive 114.

As will be described in detail later, side surfaces 112A of the metal foil 112, namely, surfaces that extend in the thickness direction of the metal foil, function as discharge surfaces in a neutralizing phenomenon as will be described later. Accordingly, the side surfaces 112A of the metal foil 112 preferably have a multiplicity of protrusions 112B like minute protrusions, so that the neutralizing phenomenon takes place efficiently. Also, a surface 112C (upper surface in FIG. 5) of the metal foil 112 may be subjected to machining for increasing the surface roughness, so that a multiplicity of protrusions like minute protrusions are formed on the surface of the metal foil 112.

As will be described in detail later, the metal foil 112 may be formed of any metal having electric conductivity, but is preferably formed of aluminum, gold, silver, copper, or an alloy thereof. In particular, when the charge eliminator is fixed to a metal member, as in the first exemplary embodiment, the metal foil of the charge eliminator preferably has a higher conductivity than a metal material that forms the metal member. Further, the thickness of the metal foil 112 is preferably about 50-200 m, so that the side surfaces of the metal foil 112 can sufficiently function as discharge surfaces, and so that the metal foil 112 can be fixed to a curved surface while being deformed so as to flexibly conform to the curved surface.

The planar shape of the charge eliminator 110A is not limited to the strip-like rectangular shape, but may be any shape, such as a polygonal shape other than the rectangular shape, or a circular or elliptical shape. However, the charge eliminator 110A is preferably formed in a shape that permits shearing or cutting without producing any portions to be discarded, such as a rectangle, square, rhomboid, or a hexagon. The size of the charge eliminator 110A may be set as appropriate depending on the location where it is used. In the case where the charge eliminator 110A has a rectangular shape, for example, the short side may be about several millimeters to several tens of millimeters, while the long side may be about several tens of millimeters to a hundred millimeters.

As described above, when the vehicle 21 runs, the vehicle is positively charged, and therefore, members, such as the bearing 16 and the knuckle 18 that constitute the wheel support device 10, are positively charged. In general, the quantity of electric charge carried by a resin member is larger than that of charge carried by a metal member, and the quantity of charge carried by an oil solution is smaller than that of charge carried by the metal member. In the case of the wheel support device 10, the charge quantity of the seal member 68 made of resin is larger than those of the bearing 16, knuckle 18, and axle hub 58 made of metal, but the charge quantity of the grease 66 is smaller than those of the bearing 16, knuckle 18, and the axle hub 58.

Figure 6:
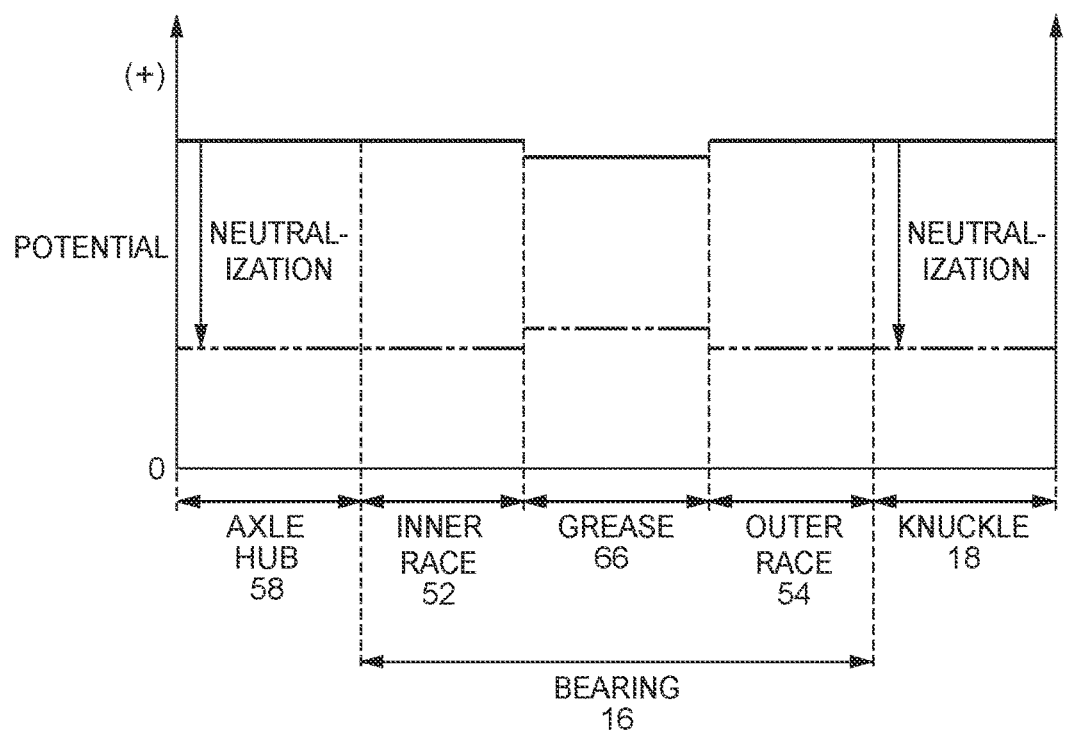
FIG. 6 is a view showing the relationship of the potentials of an inner race and an outer race of a bearing, a knuckle, an axle hub, and grease, when they are positively charged.

Accordingly, when neutralization is not performed by the charge eliminator 110A, etc., the relationship of the potentials of the inner race 52 and outer race 54 of the bearing 16, knuckle 18, axle hub 58, and the grease 66 when they are positively charged is supposed to be the relationship indicated by solid lines in FIG. 6. As described above, positive charges are generated and the wheel 12 is positively charged, due to repeated contact and separation of the tire 80 with and from the road surface. The positive charges generated in the wheel 12 move to the bearing 16, knuckle 18, and the axle hub 58, and move from the inner race 52 and outer race 54 of the bearing 16 to the grease 66.

The potential of the grease 66 is lowest, among the above-described members and portions. However, as the charge quantities of the inner race 52 and outer race 54 of the bearing 16 increase, electric charges carried by these members move to the grease 66, so that the charge quantity of the grease 66 is increased, and its viscosity is increased. As the viscosity of the grease 66 is increased, the viscosity resistance in the bearing 16 during rotation of the wheel 12 is increased. Thus, it is preferable to reduce the charge quantity of the grease 66, through neutralization by the charge eliminator 110A, etc.

Figure 7A:
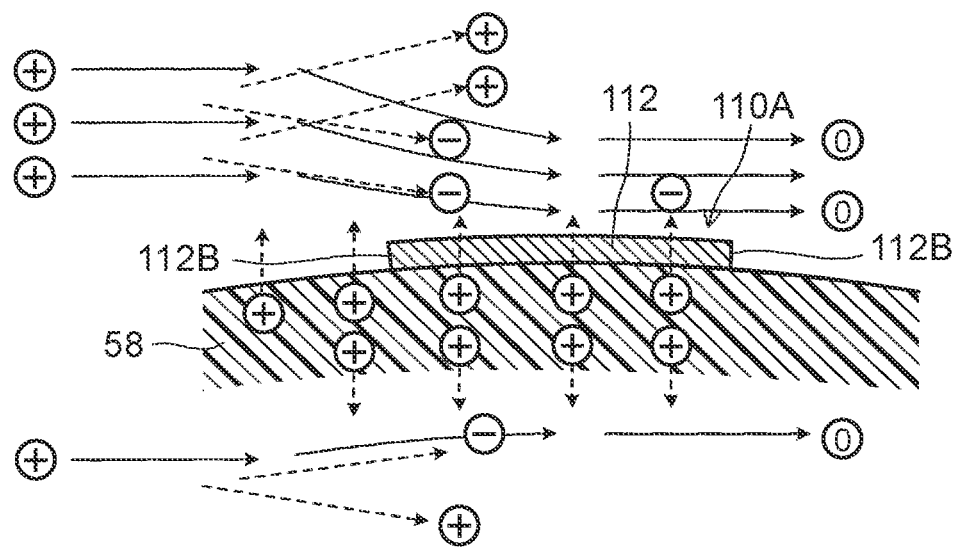
Figure 7B:
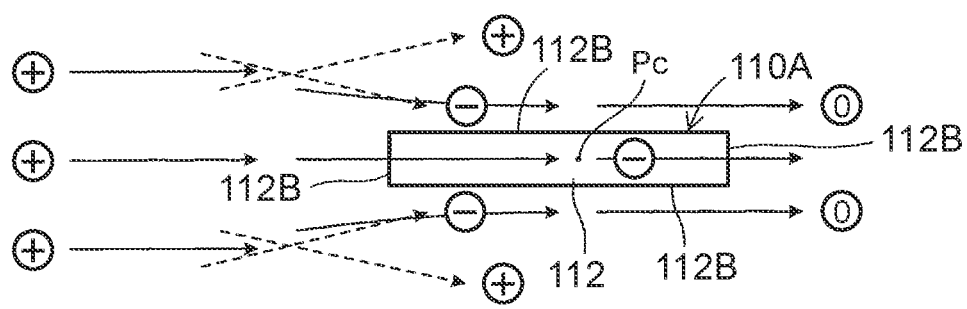

FIGS. 7A and 7B are a schematic explanatory views showing a mechanism of neutralization by the charge eliminator 110A, and the neutralization is presumed to be performed by the charge eliminator 110A by use of the mechanism shown in FIGS. 7A and 7B. In FIGS. 7A and 7B, "+" and "−" represent positive and negative charges or ions, and "0" indicates that charge is equal to 0, i.e., an electrically neutralized condition. Also, in FIGS. 7A and 7B, solid-line arrows indicate flow of air, and broken-line arrows indicate flow of charges or ions.

The air is positively charged. However, if the quantity of positive charges carried by the axle hub 58 is considerably increased, the air is separated into positive air ions and negative air ions through so-called corona discharge, at around the charge eliminator 110A, in particular, around the side surfaces 112A of the metal foil 112 having a multiplicity of protrusions 112B. The positive air ions move away from the axle hub 58, due to repulsive force that acts between the positive air ions and the positive charges carried by the axle hub 58. On the other hand, the negative air ions are attracted toward the axle hub 58, due to the Coulomb force that acts between the negative air ions and the positive charges carried by the axle hub 58, so that the negative air ions move to be close to the axle hub 58, and the positive charges carried by the axle hub 58 move to be close to the negative air ions.

As a result, electrical neutralization takes place between the negative air ions and the positive charges, and the negative air ions and the positive charges are eliminated, so that electric charge of the air becomes equal to 0. Since the above-described phenomenon occurs repeatedly and continuously, the positive charges carried by the axle hub 58 are reduced, whereby the axle hub 58 is neutralized. The air is more likely to be separated into positive air ions and negative air ions through corona discharge as the charge quantity of the axle hub 58 is larger; therefore, the neutralization is presumed to be more active as the charge quantity is larger. The neutralization by the charge eliminator 110A is not limited to the situation where air flows in one direction, as shown in FIGS. 7A and 7B.

The lower portion of FIG. 7A shows a mechanism of neutralization on one side of a plate-like member opposite to the charge eliminator, in the case where the charge eliminator is fixed to the plate-like member, like the charge eliminator 110C fixed to the brake back plate 62. As shown in FIG. 7A, neutralization is also performed on the side of the plate-like member opposite to the charge eliminator.

According to the result of experimental research conducted by the inventor, when the metal foil 112 (an aluminum foil having a thickness of 200 m) of the charge eliminator 110A has a rectangular shape of the above-indicated dimensions, or another shape of substantially the same size, the range in the planar direction having the effect of the neutralization is the range of about 50 mm in radius from the center Pc of the metal foil 112. Also, the range in the thickness direction having the effect of the neutralization is the range of several millimeters to several tens of millimeters from the surface to which the metal foil 112 is attached, within the range in the planar direction having the effect of the neutralization. The range having the effect of the neutralization changes depending on conditions, such as the quantity of positive charge. The surfaces of the charge eliminators 110A-110D which are bonded to members, such as the axle hub 58, lie within the ranges in which the effect of the neutralization is exerted or provided by the corresponding charge eliminators.

As indicated by two-dot chain lines in FIG. 6, positive charges carried by the axle hub 58 and the inner race 52 are reduced, through neutralization by the charge eliminator 110A, and the potential of the axle hub 58 and the inner race 52 is lowered. Accordingly, positive charges carried by the grease 66 move to the inner race 52 to be reduced, and the potential of the grease 66 is lowered. Similarly, positive charges carried by the knuckle 18 and the outer race 54 are reduced, through neutralization by the charge eliminator 110B, and the potential of the knuckle 18 and the outer race 54 is lowered. Accordingly, positive charges carried by the grease 66 move to the outer race 54 to be reduced, and the potential of the grease 66 is lowered.

The potential of the outer race 54 is also lowered when positive charges carried by the brake back plate 62 and the seal member 68 are reduced, through neutralization by the charge eliminators 110C and 110D, respectively, and the potentials of the brake back plate 62 and the seal member 68 are lowered. Further, the charge eliminator 110D reduces positive charges carried by the grease 66 that contacts with the charge eliminator 110D, and reduces positive charges carried by the inner race 52 via the seal member 68.

In the case of a coated metal member, like the knuckle 18, a coating film as well as the metal member is electrically charged, but electric charges carried by the coating film close to the charge eliminator move to the charge eliminator, so as to be reduced. Also, electric charges carried by the metal member pass through the coating film and move to the charge eliminator, so as to be reduced. Further, electric charges carried by the coating film at a location remote from the charge eliminator move to the metal member and move within the metal member, and then move from the metal member to the charge eliminator through the coating film.

Thus, according to the first embodiment, the grease 66 in the bearing 16 is prevented from being excessively charged with positive charges. Accordingly, the viscosity of the grease 66 can be prevented from being excessively increased due to excessive charging, and the viscosity resistance in the bearing 16 during rotation of the wheel 12 can be prevented from being excessively large.

In particular, according to the first exemplary embodiment, the wheel 12 is the drive wheel, and the axle 82 is coupled integrally with the axle hub 58, and is coupled at its inner end to the outer end of the intermediate shaft 88 with the universal joint 86. Since positive charges carried by the axle hub 58 are reduced through neutralization by the charge eliminator 110A, positive charges carried by the outer ring 94 of the universal joint 86 are reduced. As a result, positive charges carried by the grease 102 in the outer ring 94 are reduced, so that the viscosity of the grease 102 can be prevented from being excessively increased due to excessive charging, and the viscosity resistance in the universal joint 86 during rotation of the axle 82 and the intermediate shaft 88 can be prevented from being excessively large.

Second Exemplary Embodiment

Figure 8:
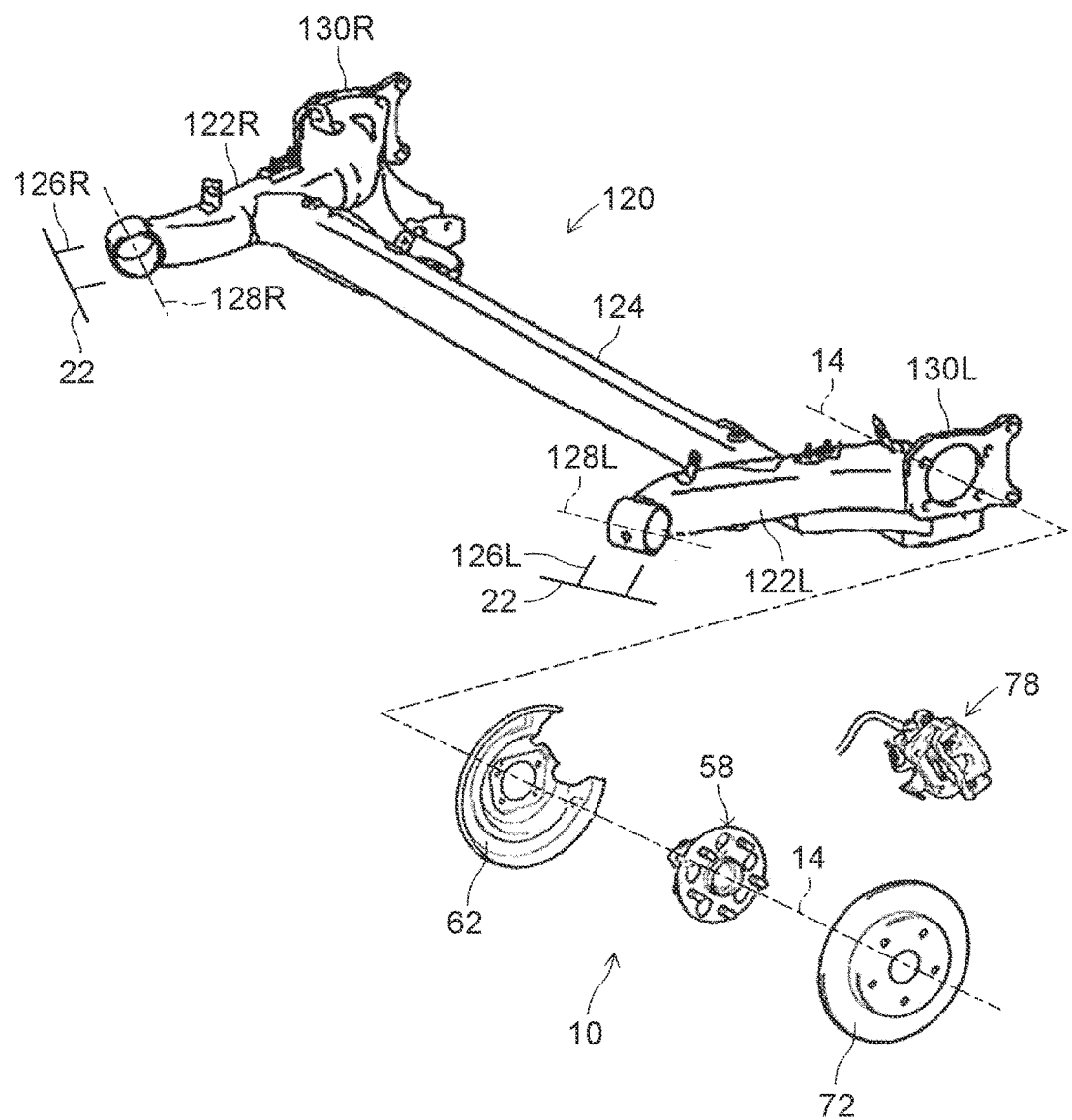
FIG. 8 is an exploded perspective view showing a wheel support device according to a second exemplary embodiment, which is used for a twist-beam type rear suspension 120, as viewed at an angle from the front of the vehicle.
Figure 9:
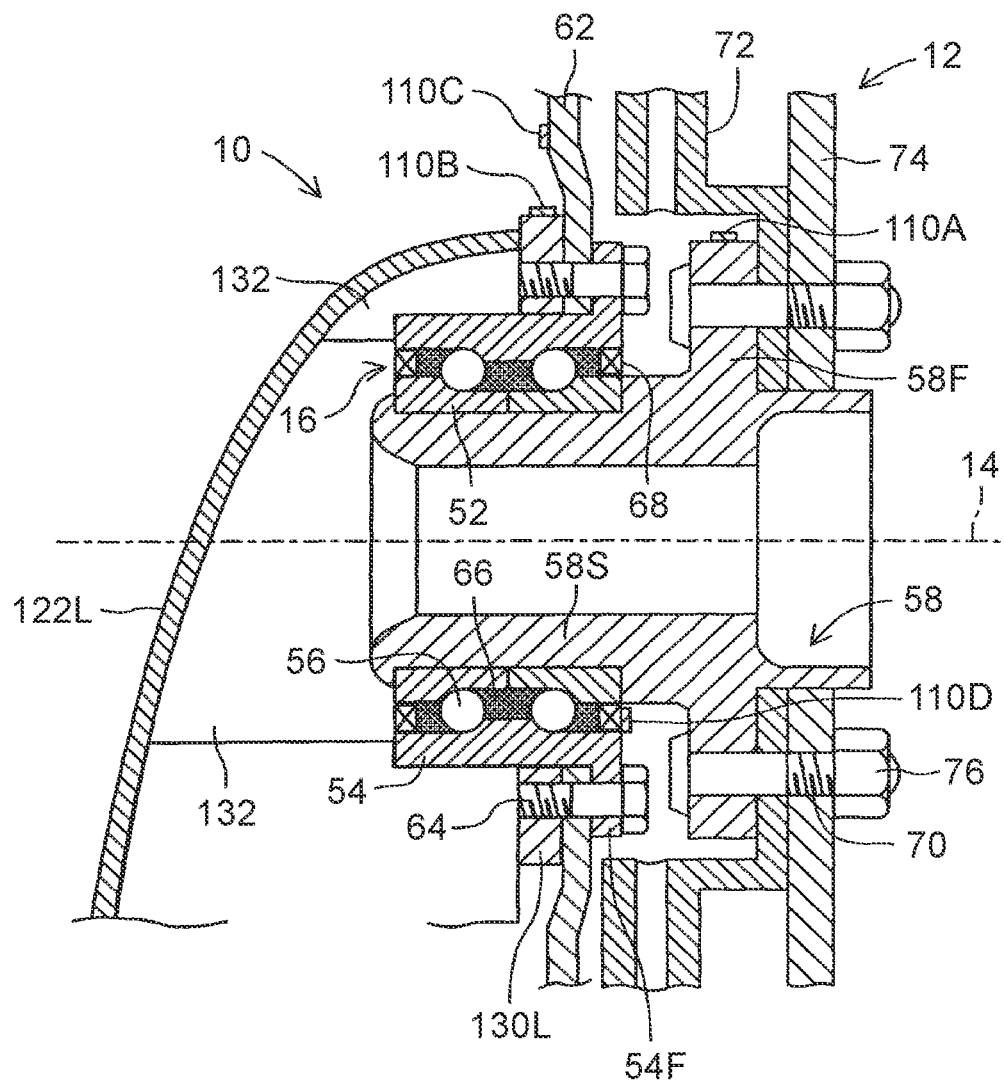
FIG. 9 is an enlarged partial cross-sectional view showing a principal part of the wheel support device shown in FIG. 8.

FIG. 8 is an exploded perspective view showing a wheel support device 10 according to a second embodiment of the invention, as seen at an angle from the front of the vehicle. The wheel support device 10 is used for a twist-beam type rear suspension 120. FIG. 9 is an enlarged, partial cross-sectional view showing a principal part of the wheel support device 10 shown in FIG. 8. In FIG. 8 and FIG. 9, the same reference numerals as those used in FIG. 1 through FIG. 3 are assigned to members corresponding to the members shown in FIG. 1 through FIG. 3.

The twist-beam type rear suspension 120 shown in FIG. 8 has right and left trailing arms 122R, 122L that are spaced from each other in the lateral direction and extend in the longitudinal direction of the vehicle, and a twist beam 124 that integrally connects these trailing arms. As shown in the schematic view of FIG. 8, the front ends of the trailing arms 122R and 122L are supported by brackets 126R and 126L provided on the vehicle body 22 or a sub frame (not shown), via rubber bushings (not shown), such that the trailing arms 122R, 122L can pivot about respective axes 128R and 128L.

Brackets 130R and 130L for mounting of wheels are integrally fixed by welding, for example, to rear end portions of the trailing arms 122R and 122L. The brackets 130R and 130L extend substantially in the longitudinal direction and vertical direction of the vehicle. A brake caliper assembly 78 is attached to each of the brackets 130R and 130L. Although only the wheel support device 10 for the left rear wheel is illustrated in FIG. 8, the wheel support devices 10 for the right and left rear wheels have the same structure, except that the devices 10 are symmetrical with each other, with respect to the center line that extends in the longitudinal direction of the vehicle. Thus, in the following, only the wheel support device 10 for the left rear wheel will be described.

As shown in FIG. 9, the wheel support device 10 includes a bearing 16 whose axis is in alignment with a rotational axis 14, and an axle hub 58 having a sleeve portion 58S fitted inside the bearing 16. In this embodiment, too, an inner race 52 of the bearing 16 is disposed around the sleeve portion 58S, and is fixed to the sleeve portion 58S by caulking an inner end portion of the sleeve portion 58S, for example. However, the axle is not fitted in the axle hub 58, but the axle hub 58 itself functions as a rotary shaft, and rotates about the rotational axis 14 along with a wheel member 74 of the wheel 12 and a brake disc 72. The inner race 52 may be fixed to the sleeve portion 58S by means other than caulking, such as bolt fastening.

Inner end portions of the bearing 16 and the sleeve portion 58S of the axle hub 58 are inserted in a rear end portion of the trailing arm 122L, and a flange portion 54F of the outer race 54 of the bearing 16 is disposed on the laterally outer side of the vehicle, relative to the bracket 130L. A radially inner portion of a brake back plate 62 is disposed between the flange portion 54F and the bracket 130L, and the flange portion 54F and the brake back plate 62 are fixed to the bracket 130L with bolts 64. A plurality of ribs 132 are integrally provided in the inside of the trailing arm 122L, and the outer race 54 of the bearing 16 is positioned and held by these ribs 132.

As is understood from the above description, the inner race 52 is a rotary race member of the bearing 16; therefore, the axle hub 58 functions as a rotating support member that supports the bearing 16. On the other hand, the outer race 54 is a stationary race member of the bearing 16; therefore, the bracket 130, etc. function as a stationary support member that supports the bearing 16.

As shown in FIG. 9, a self-discharge type charge eliminator 110A in the form of a strip or a reed is fixed by bonding to a cylindrical surface of the flange portion 58F of the axle hub 58, so as to extend in the circumferential direction. A self-discharge type charge eliminator 110C in the form of a strip is fixed by bonding to an inner surface of the brake back plate 62 as viewed in the vehicle lateral direction, so as to vertically extend in a radial direction. A self-discharge type charge eliminator 110D in the form of a strip is fixed by bonding to an outer surface of a seal member 68 on the outer side in the vehicle lateral direction, so as to extend in the circumferential direction. Further, a self-discharge type charge eliminator 110B in the form of a strip is fixed by bonding to an outer circumferential surface of the bracket 130L which extends in the vehicle lateral direction, such that the charge eliminator 110B extends in the circumferential direction. The surfaces of the charge eliminators 110A-110D bonded to members, such as the axle hub 58, lie within the ranges in which the effect of neutralization is exerted or provided by the corresponding charge eliminators.

Thus, the second exemplary embodiment is similar to the first exemplary embodiment in that positive charges carried by the inner race 52, outer race 54 and the seal member 68 are reduced by the charge eliminators 110A-110D, but is different from the first exemplary embodiment in that positive charges carried by the bracket 130L and the outer race 54 of the bearing 16 are reduced by the charge eliminator 110B. As a result, the grease 66 in the bearing 16 can be prevented from being excessively charged with positive charges. Accordingly, the viscosity of the grease 66 can be prevented from being excessively increased due to excessive charging, and the viscosity resistance in the bearing 16 during rotation of the wheel 12 can be prevented from being excessively large.

In particular, according to the second exemplary embodiment, the outer race 54 of the bearing 16 is attached to the bracket 130L integrally fixed to the rear end portion of the trailing arm 122L. Thus, it will be understood that, even in the case of the bearing support member in which the stationary race member of the bearing is integrally fixed to the suspension arm, the grease in the bearing can be prevented from being excessively charged with positive charges.

Third Exemplary Embodiment

Figure 10:
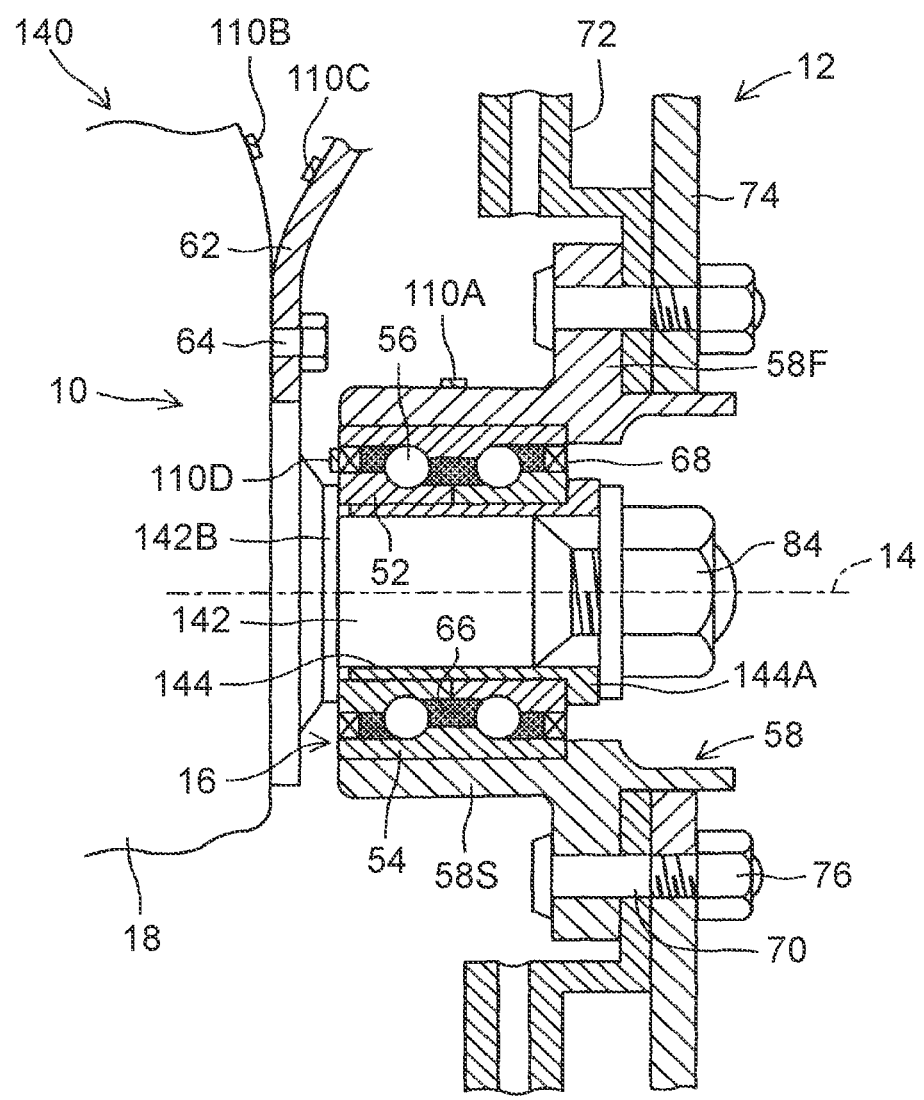
FIG. 10 is an enlarged, partial cross-sectional view showing a principal part of a wheel support device according to a third exemplary embodiment, which is used for a McPherson strut type front suspension.

FIG. 10 is an enlarged partial cross-sectional view showing a principal part of a wheel support device 10 according to a third exemplary embodiment of the invention, which is used for a McPherson strut type front suspension 140. In FIG. 10, the same reference numerals as those used in FIG. 1 through FIG. 3 are assigned to members corresponding to the members shown in FIG. 1 through FIG. 3.

The front suspension 140 shown in FIG. 10 is a suspension for a driven front wheel. A spindle 142 that extends along a rotational axis 14 is integrally provided on a knuckle 18. A bearing 16 is fitted inside a sleeve portion 58S of an axle hub 58, and an outer race 54 is press-fitted in the sleeve portion 58S, thereby to be fixed to the sleeve portion 58S. An inner race 52 of the bearing 16 is fitted on the spindle 142, and a sleeve 144 having a flange portion 144A at one end is interposed between the inner race 52 and the spindle 142. As in the first and second exemplary embodiments, a brake disc 72 and a wheel member 74 of a wheel 12 are attached to a flange portion 58F of the axle hub 58.

A hub nut 84 is screwed on a distal end of the spindle 142, and the hub nut 84 holds the inner race 52 via the flange portion 144A such that the inner race 52 is sandwiched between the flange portion 144A and a large-diameter base portion 142B of the spindle 142. The inner race 52 and the base portion 142B are engaged so as not to rotate relative to each other about the rotational axis 14, by means, such as mutually engaging protrusions and recesses. Thus, the knuckle 18 supports the axle hub 58, brake disc 72, and the wheel member 74, via the bearing 16, by means of the spindle 142, such that these members 58, 72, 74 can rotate about the rotational axis 14. Accordingly, in the third exemplary embodiment, the inner race 52 functions as a stationary race of the bearing that supports the wheel 12 such that it can rotate about the rotational axis 14, and the outer race 54 functions as a rotary race of the bearing.

As is understood from the above description, the inner race 52 is the stationary race member of the bearing 16; therefore, the knuckle 18 having the spindle 142, sleeve 144, etc. function as a stationary support member that supports the bearing 16. On the other hand, the outer race 54 is the rotary race member of the bearing 16; therefore, the axle hub 58 functions as a rotary support member that supports the bearing 16.

As shown in FIG. 10, self-discharge type charge eliminators 110B and 110C in the form of strips are fixed by bonding to an outer surface of the knuckle 18 as viewed in the vehicle lateral direction and an inner surface of the brake back plate 62 as viewed in the vehicle lateral direction, so as to vertically extend in radial directions. A self-discharge type charge eliminator 110D in the form of a strip is fixed by bonding to an outer surface of the seal member 68 on the inner side in the vehicle lateral direction, so as to extend in the circumferential direction. Further, a self-discharge type charge eliminator 110A in the form of a strip is fixed by bonding to a surface of the sleeve portion 58S of the axle hub 58 so as to extend in the circumferential direction. The surfaces of the charge eliminators 110A-110D which are bonded to members, such as the axle hub 58, lie within the ranges in which the effect of neutralization is exerted or provided by the corresponding charge eliminators.

Accordingly, as in the first exemplary embodiment, positive charges carried by the inner race 52 and the outer race 54 are reduced by the charge eliminators 110A-110C. Further, as in the first embodiment, positive charges carried by the seal member 68 are reduced by the charge eliminator 110D. Thus, the grease 66 in the bearing 16 can be prevented from being excessively charged with positive charges. Accordingly, the viscosity of the grease 66 can be prevented from being excessively increased due to excessive charging, and the viscosity resistance in the bearing 16 during rotation of the wheel 12 can be prevented from being excessively large.

In particular, according to the third exemplary embodiment, the inner race 52 of the bearing 16 is fixed to the spindle 142 of the knuckle 18 as a non-rotating member, and the outer race 54 is fixed to the sleeve portion 58S of the axle hub 58 as a rotating member. Thus, it will be understood that, in the case where the inner race 52 of the bearing 16 is a stationary race member, and the outer race 54 is a rotary race member, too, the grease in the bearing can be prevented from being excessively charged with positive charges.

With regard to the wheel support devices 10 according to the above-described exemplary embodiments, the following effect can be confirmed, by experiments conducted by the inventor. Namely, in the case where the self-discharge type charge eliminators 110A-110D are not provided, the potential of the grease 66 in the bearing 16 was found to rise up to several hundreds to a thousand of volts. On the other hand, according to the arrangement of the first exemplary embodiment, the potential of the grease 66 was found to rise only up to several tens of volts, and appropriate viscosity of the grease 66 was ensured.

As is understood from the above description, the charge eliminators 110A-110D of each embodiment are so-called ion separation type, non-earth-type, self-discharge charge eliminators. Namely, the charge eliminator 110A, for example, separates air into positive air ions and negative air ions through corona discharge, and eliminates charge through electric neutralization between positive charges carried by a constituent member of the wheel support device 10 and negative air ions, without requiring wiring for electric grounding. Accordingly, as compared with the case where the electrostatic eliminator described in the above-mentioned patent publication is used, the structure for eliminating charge in the wheel support device 10 is simplified, and the cost needed for achieving charge elimination or neutralization can be significantly reduced.

In particular, according to the first through third exemplary embodiments, positive charges carried by both of the inner race 52 and the outer race 54 are reduced through neutralization by the charge eliminators 110A-110D. Thus, the grease 66 can be more effectively prevented from being excessively charged with positive charges, as compared with the case where only positive charges carried by one of the inner race 52 and the outer race 54 are reduced.

According to the first through third exemplary embodiments, positive charges carried by the seal member 68 are reduced by the charge eliminator 110D fixed to a surface of the seal member 68 made of resin, and positive charges carried by the grease 66 that is in contact with the seal member 68 are reduced. Thus, positive charges carried by the grease 66 can be more effectively reduced, as compared with the case where no charge eliminator is fixed to the surface of the seal member 68.

Also, according to the first through third exemplary embodiments, when the self-discharge type charge eliminator is installed on the axle hub 58, for example, the charge eliminator is directly fixed by bonding to the member. Thus, since there is no need to add a special member for fixing the charge eliminator in position, it is possible to reduce the quantity of electric charge of the grease 66 in the bearing 16, without making the structure of the wheel support device 10 complicated or increasing the cost. It is confirmed that, even where the seal member 68 is made of rubber, the quantity of charge of the grease 66 can be reduced, by fixing the self-discharge type charge eliminator in the same manner as that in the case of each of the illustrated exemplary embodiments.

Further, according to the first through third exemplary embodiments, each of the charge eliminators 110A-110D takes the form of a tape formed by attaching the conductive adhesive 114 to the conductive metal foil 112, and the charge eliminator is fixed to a member to be neutralized, by bonding the metal foil 112 to the member to be neutralized, by means of the adhesive 114. Thus, the metal foil that eliminates charge on the surface of the member to be neutralized can be easily fixed by bonding. Further, since the layer of the adhesive has electric conductivity, charges are efficiently moved from a particular member to the metal foil, so that the effect of neutralization can be enhanced, as compared with the case where the layer of the adhesive does not have electric conductivity. If the thickness of the adhesive layer is in the range of several tens to several hundreds of microns, charges can move from the particular member to the metal foil even if the adhesive layer does not have conductivity. Thus, the adhesive layer may not have electric conductivity.

While the particular embodiments of the invention have been described above in detail, this invention is not limited to the above-described embodiments, but it would be apparent to those skilled in the art that the invention can be practiced in various other embodiments within the range of the invention.

For example, in each of the above-described exemplary embodiments, the self-discharge type charge eliminators 110A-110D are fixed to the bearing 16, knuckle 18 as a bearing support member, and the brake back plate 62 as an accessory member connected to the knuckle 18. However, any one or more of the charge eliminators 110A-110D may be omitted.

The positions at which the charge eliminators are fixed, the number of charge eliminators, and the direction of extension of each charge eliminator are not limited to those of each of the above-described exemplary embodiments. For example, the charge eliminator 110A may be fixed to a side surface of the flange portion 58F of the axle hub 58. Also, in each of the exemplary embodiments, the charge eliminator fixed so as to extend in a circumferential direction may be fixed so as to extend in a radial direction.

In each of the above-described embodiments, no self-discharge type charge eliminator is provided on the inner race 52 and outer race 54 of the bearing 16. However, if possible, the inner race 52 and/or the outer race 54 may be provided with a self-discharge type charge eliminator or eliminators.

While the bearing 16 is described as a ball bearing including balls as rolling elements in each of the above-described exemplary embodiments, the bearing may be a rotor bearing including a rotor as a rolling element. Also, while the seal members 68 are described as being provided at the opposite ends of the bearing 16, the seal member 68 may not be provided.

In each of the above-described exemplary embodiments, the brake disc 72 is provided, which means that a braking device that applies braking force to the wheel is a disc brake. However, the wheel support device may be used in a vehicle having a drum brake as a braking device.

Further, the suspension is the McPherson strut type front suspension in the above-described first and third embodiments, and the suspension is a twist-beam type rear suspension in the second embodiment. However, the suspension of the vehicle in which the wheel support device of the invention is used may be any other type of suspension, such as a double wishbone type suspension, trailing arm type suspension, or an axle-type suspension.

What is claimed is:

1. A wheel support device for a vehicle, the vehicle having a body electrically insulated from a road surface, comprising:
   a bearing rotatably supporting a wheel, and being lubricated by a lubricant;
   a bearing support member supporting the bearing;
   an accessory member connected to the bearing support member; and
   a self-discharge type charge eliminator being provided on a surface of a particular member, the particular member being at least one of the bearing, the bearing support member, and the accessory member, wherein
   the self-discharge type charge eliminator is an air-ion-exchange type self-discharge charge eliminator configured to change air around the self-discharge type charge eliminator into negative air ions, according to a quantity of positive charges carried by the particular member, and to eliminate a quantity of charge carried by the lubricant by causing the negative air ions to attract the positive charges carried by the particular member for neutralization, so as to reduce the quantity of charges carried by the particular member, and thereby reduce the quantity of charge carried by the lubricant,
wherein:
the self-discharge type charge eliminator includes an electrically conductive metal foil having a multiplicity of protrusions and recesses al a side surface of an outer periphery, and an adhesive layer on a surface of the metal foil; and
the self-discharge type charge eliminator is fixed to the particular member by bonding using the adhesive layer.

2. The wheel support device according to claim 1, wherein:
the bearing includes a rotary race member that rotates with the wheel, a stationary race member, and a plurality of rolling elements, the rolling elements being interposed between the rotary race member and the stationary race member;
the particular member is the bearing support member;
the bearing support member includes a rotating support member, the rotating support member supporting the rotary race member;
the self-discharge type charge eliminator is provided on the rotating support member; and
charges can move between the rotary race member and the rotating support member.

3. The wheel support device according to claim 1, wherein:
the bearing includes a rotary race member that rotates with a rotary shaft, a stationary race member, and a plurality of rolling elements, the rolling elements being interposed between the rotary race member and the stationary race member;
the particular member is the bearing support member;
the bearing support member includes a non-rotating support member, the non-rotating support member supporting the stationary race member;
the self-discharge type charge eliminator is provided on the non-rotating support member; and
charges can move between the stationary race member and the non-rotating support member.

4. The wheel support device according to claim 1, wherein:
the bearing includes a rotary race member that rotates with a rotary shaft, a stationary race member, a plurality of rolling elements, and a seal member, the rolling elements being interposed between the rotary race member and the stationary race member, the seal member being made of a resin and providing a seal between the rotary race member and the stationary race member in an end portion of the bearing;
the particular member is the bearing;
the self-discharge type charge eliminator is provided on the seal member; and
charges can move between at least one of the rotary race member and the stationary race member, and the seal member.

5. The wheel support device according to claim 1, wherein:
the bearing includes a rotary race member that rotates with a rotary shaft, a stationary race member, and a plurality of rolling elements, the rolling elements being interposed between the rotary race member and the stationary race member;
the particular member is the accessory member;
the accessory member comprises a brake back plate;
the self-discharge type charge eliminator is provided on the brake back plate;
and charges can move between the stationary race member and the brake back plate.

6. The wheel support device according to claim 1, wherein:
the wheel is a drive wheel;
the bearing rotatably supports a rotary shaft that rotates with the drive wheel; and
a driving force from a drive shaft is transmitted to the rotary shaft via a universal joint.

* * * * *